United States Patent [19]
Komatsu

[11] Patent Number: 5,774,248
[45] Date of Patent: Jun. 30, 1998

[54] OPTICAL SCANNING APPARATUS

[75] Inventor: Teruo Komatsu, Yokohama, Japan

[73] Assignee: Canon Kabushiki Kaisha, Tokyo, Japan

[21] Appl. No.: 917,279

[22] Filed: Aug. 25, 1997

Related U.S. Application Data

[63] Continuation of Ser. No. 270,475, Jul. 5, 1994, abandoned.

[30] Foreign Application Priority Data

Jul. 8, 1993 [JP] Japan .................................... 5-193137

[51] Int. Cl.$^6$ .................................................. G02B 26/08
[52] U.S. Cl. ........................ 359/204; 359/201; 359/209; 359/216; 347/233; 347/242
[58] Field of Search .............................. 372/23; 359/196, 359/209, 214, 216, 217, 218, 219, 204, 201; 347/234, 245, 233, 242, 134, 241, 237, 243, 244

[56] References Cited

U.S. PATENT DOCUMENTS

| | | | |
|---|---|---|---|
| 4,163,600 | 8/1979 | Russell | 359/216 |
| 4,253,102 | 2/1981 | Kataoka et al. | 347/234 |
| 4,321,700 | 3/1982 | Russell | 359/216 |
| 4,800,401 | 1/1989 | Sato et al. | 347/245 |
| 4,953,171 | 8/1990 | Nakajima et al. | 372/44 |
| 5,006,705 | 4/1991 | Saito et al. | 250/235 |
| 5,138,479 | 8/1992 | Ando | 359/216 |
| 5,255,115 | 10/1993 | Kikuchi | 359/209 |
| 5,305,023 | 4/1994 | Fukushige et al. | 347/235 |
| 5,317,444 | 5/1994 | Iwasaki | 359/214 |

FOREIGN PATENT DOCUMENTS

| | | | |
|---|---|---|---|
| 3-200917 | 9/1991 | Japan . | |
| 5-93879 | 4/1993 | Japan | 359/204 |

Primary Examiner—Paul M. Dzierzynski
Assistant Examiner—Darren E. Schuberg
Attorney, Agent, or Firm—Fitzpatrick, Cella, Harper & Scinto

[57] ABSTRACT

An optical scanning apparatus can record image information in a plurality of resolutions by changing the pitch (scanning interval) of light beams in a direction orthogonal to the scanning direction. In the apparatus, a plurality of light beams emitted from a light-source unit having a plurality of light-emitting portions are guided to a deflector via an optical system, and are deflected and reflected by the deflector. The light beams are then guided to a surface to be scanned via an imaging unit, so that the surface is simutaneously scanned by the plurality of light beams. At that time, an angle θ between a first line connecting imaged positions of the plurality of light beams on the surface and a second line obtained by the scanning line of the light beams in the scanning direction on the surface, can be changed by an angle adjusting unit.

76 Claims, 14 Drawing Sheets

300dpi

600dpi

OPTICAL SCANNING APPARATUS

This application is a continuation of application Ser. No. 08/270,475 filed Jul. 5, 1994, now abandoned.

BACKGROUND OF THE INVENTION

1. Field of the Invention

This invention relates to an optical scanning apparatus which is suitable for a laser copier, a laser-beam printer (LBP), or the like. More particularly, the invention relates to an optical scanning apparatus in which when performing optical scanning of a surface, such as a photosensitive member's surface or the like, using a plurality of light beams, image information can be recorded in a plurality of resolutions (recording densities) by utilizing angle adjusting means, which can change the pitch (or "scanning interval") of the light beams in a sub-scanning direction which is orthogonal to a main scanning direction of the light beams.

2. Description of the Related Art

In optical scanning apparatuses, such as laser copiers, laser-beam printers or the like, in order to respond to requests for high-speed printing, multicolor printing, high printing density, and the like, it is desired to use a plurality of light sources, and to simultaneously scan the surface of a photosensitive medium, serving as a surface to be scanned, with a plurality of light beams.

In some of such optical scanning apparatuses, a plurality of optical means (optical systems) are disposed symmetrically with respect to a plane including the rotating shaft of a light deflector (for example, a rotating polygonal mirror) and a corresponding plurality of light beams are projected onto one deflecting surface of the light deflector. For example, two optical means may be used to project two light beams onto one deflecting surface of the polygonal mirror. The two light beams deflected and reflected by the deflecting surface are guided to different regions on a surface to be scanned via a common imaging optical system to simultaneously perform optical scanning of the surface, whereby image information is recorded.

In another approach, a single optical system projects a plurality of, for example, two or four, light beams on one deflecting surface of a light deflector. The plurality of light beams deflected and reflected by the deflecting surface are guided to different regions on a surface to be scanned via a common imaging optical system to simultaneously perform optical scanning of the surface, whereby image information is recorded.

In these optical scanning apparatuses, when considering, for example, the reduction of the size or the cost of the entire apparatus, it is desirable to perform deflection scanning by a plurality of light beams using single optical means.

In optical scanning apparatuses used in LBP's or the like, it is necessary to change the pitch of light beams for forming an image in accordance with the environmental state, the software, or some condition of a host computer, connected to the apparatus.

That is, it is necessary to change the resolution (recording density) represented by the number of dots per unit length in accordance with the state of the use (environment). For example, in the case of LBP's, a plurality of resolutions can generally be dealt with.

In order to change the resolution in an optical scanning apparatus using a multibeam laser, which has a plurality of light-emitting portions (semiconductor lasers), as light-source means, the emission interval of each light beam, i.e., the image clock frequency, may, for example, be changed in the scanning direction (the main scanning direction) of the light beams. However, the emission interval of each light beam cannot be changed in a direction perpendicular to the scanning direction of the light beams (the sub-scanning direction).

Accordingly, in order to obtain a desired resolution, a unit and a product must be set for each resolution.

The assignee of the present application has proposed, in Japanese Patent Laid-open Application (Kokai) No. 3-200917 (1991), a recording apparatus (an optical scanning apparatus) in which light-source means (a multibeam laser), having a plurality of light-emitting portions, is disposed inclinedly with respect to the scanning direction at a predetermined angle, and some of these light beams are selectively emitted in accordance with the recording resolution (or "density"), whereby image information can be recorded in a plurality of recording resolutions.

According to such a configuration, it is possible to drive some of the plurality of light beams in usual cases, and to drive all of the light beams in response to a specific signal to perform high-resolution recording.

In the above-described approach, however, the interval between pixels is determined when assembling the apparatus by the angle of inclination of the light-source means for generating the plurality of light beams, and therefore only two or a few pre-set recording resolutions can be obtained.

SUMMARY OF THE INVENTION

It is an object of the present invention to provide an optical scanning apparatus, in which by arranging such that at least one of light-source means, optical means and a diaphragm member is rotatable or movable by angle adjusting means, the pitch (scanning interval) of light beams in the sub-scanning direction and the size of light beam spots can be changed, so that a continuum of plural recording resolutions can be provided, and a high-quality image corresponding to a selected resolution can be obtained.

It is another object of the present invention to provide an optical scanning apparatus, in which by arranging such that at least one of light-source means, optical means and a diaphragm member is rotatable or movable by angle adjusting means, and the position after rotation or movement is detected by position detection means, the pitch (scanning interval) of light beams in the sub-scanning direction and the size of light beam spots can be changed, position deviation on one vertical line in the sub-scanning direction caused by the switching of the resolution can be corrected, i.e., synchronization in the horizontal direction is obtained, so that a plurality of resolutions can be provided, and a high-quality image corresponding to the selected resolution can be obtained.

According to one aspect, the present invention, which achieves these objectives, relates to an optical scanning apparatus comprising light-source means including a plurality of light-emitting portions, scanning means for scanning a predetermined surface with a plurality of light beams from the light-source means by deflecting the plurality of light beams, optical means disposed in an optical path between the light-source means and the scanning means, and angle adjusting means for changing an angle θ between the direction of arrangement of the plurality of light beams and the scanning direction of the light beams on the predetermined surface.

According to another aspect, the present invention relates to an optical scanning apparatus comprising light-source means including a plurality of light-emitting portions, scanning means for scanning a predetermined surface with a plurality of light beams from the light-source means by deflecting the plurality of light beams, and angle adjusting means for changing an angle θ between the direction of arrangement of the plurality of light beams and the scanning direction of the light beams on the predetermined surface.

According to still another aspect, the present invention relates to an optical scanning apparatus comprising light-source means including a plurality of light-emitting portions, rotation means for rotating the light-source means, and deflection means for deflecting light beams from the light-source means.

According to yet another aspect, the present invention relates to an optical scanning apparatus comprising optical means including a plurality of light-emitting portions, rotation means for rotating at least a part of the optical means, and deflection means for deflecting light beams from the optical means.

According to a further aspect, the present invention relates to an optical scanning apparatus comprising light-source means including a plurality of light-emitting portions, emission control means for controlling the plurality of light-emitting portions, scanning means for scanning a predetermined surface with a plurality of light beams from the light-source means by deflecting the plurality of light beams, optical means disposed in an optical path between the light-source means and the scanning means, synchronization detection means for detecting the timing of the start of the scanning on the predetermined surface, angle adjusting means for changing an angle θ between the direction of arrangement of the plurality of light beams and the scanning direction of the light beams on the predetermined surface, position detection means for detecting information relating to a position adjusted by the angle adjusting means, and control means for controlling the emission control means by linking the synchronization detection means with the position detection means.

According to a still further aspect, the present invention relates to an optical scanning apparatus comprising light-source means including a plurality of light-emitting portions, emission control means for controlling the plurality of light-emitting portions, scanning means for scanning a predetermined surface with a plurality of light beams from the light-source means by deflecting the plurality of light beams, synchronization detection means for detecting the timing of the start of the scanning on the predetermined surface, and angle adjusting means for changing an angle θ between the direction of arrangement of the plurality of light beams and the scanning direction of the light beams on the predetermined surface.

According to yet a further aspect, the present invention relates to a laser-beam printing apparatus comprising light-source means including a plurality of light-emitting portions, a recording medium, scanning means for scanning the recording medium with a plurality of light beams from the light-source means by deflecting the plurality of light beams, optical means disposed in an optical path between the light-source means and the scanning means, and angle adjusting means for changing an angle θ between the direction of arrangement of the plurality of light beams and the scanning direction of the light beams on the recording medium.

According to still another aspect, the present invention relates to a laser-beam printing apparatus comprising light-source means including a plurality of light-emitting portions, a recording medium, scanning means for sanning the recording medium with a plurality of light beams from the light-source means by deflecting the plurality of light beams, and angle adjusting means for changing an angle θ between the direction of arrangement of the plurality of light beams and the scanning direction of the light beams on the recording medium.

According to still another aspect, the present invention relates to a laser-beam printing apparatus comprising light-source means including a plurality of light-emitting portions, a recording medium, rotation means for rotating the light-source means, and deflection means for deflecting light beams from the light-source means.

According to still another aspect, the present invention relates to a laser-beam printing apparatus comprising optical means including a plurality of light-emitting portions, rotation means for rotating at least a part of the optical means, and deflection means for deflecting light beams from the optical means.

According to still another aspect, the present invention relates to a laser-beam printing apparatus comprising light-source means including a plurality of light-emitting portions, emission control means for controlling the plurality of light-emitting portions, a recording medium, scanning means for scanning a predetermined surface with a plurality of light beams from the light-source means by deflecting the plurality of light beams, optical means disposed in an optical path between the light-source means and the scanning means, synchronization detection means for detecting the timing of the start of the scanning on the predetermined surface, angle adjusting means for changing an angle θ between the direction of arrangement of the plurality of light beams and the scanning direction of the light beams on the recording medium, position detection means for detecting information relating to a position adjusted by the angle adjusting means, and control means for controlling the emission control means by linking the synchronization detection means with the position detection means.

According to still another aspect, the present invention relates to a laser-beam printing apparatus comprising light-source means including a plurality of light-emitting portions, emission control means for controlling the plurality of light-emitting portions, a recording medium, scanning means for scanning the recording medium with a plurality of light beams from the light-source means by deflecting the plurality of light beams, synchronization detection means for detecting the timing of the start of the scanning on the recording medium, and angle adjusting means for changing an angle θ between the direction of arrangement of the plurality of light beams and the scanning direction of the light beams on the recording medium.

According to still another aspect, the present invention relates to a scanning method for scanning a predetermined surface with a plurality of light beams comprising the steps of scanning the predetermined surface with the plurality of light beams by deflecting the plurality of light beams, and changing an angle θ between the direction of arrangement of the plurality of light beams and the scanning direction of the light beams on the predetermined surface.

According to still another aspect, the present invention relates to a scanning method for scanning a predetermined surface with a plurality of light beams comprising the steps of scanning the predetermined surface with a plurality of light beams from a light-source unit by deflecting the plurality of light beams, and rotating the light-source unit.

According to still another aspect, the present invention relates to a scanning method for scanning a predetermined surface with a plurality of light beams comprising the steps of guiding the plurality of light beams to a deflector via an optical system, scanning the predetermined surface with the plurality of light beams by deflecting the plurality of light beams by the deflector, and rotating a part of the optical system.

According to still another aspect, the present invention relates to a scanning method for scanning a predetermined surface with a plurality of light beams comprising the steps of scanning the predetermined surface with the plurality of light beams by deflecting the plurality of light beams, controlling the emission of the plurality of light beams, detecting the timing of the start of the scanning of the predetermined surface, and changing an angle θ between the direction of arrangement of the plurality of light beams and the scanning direction of the light beams on the predetermined surface.

The foregoing and other objects, advantages and features of the present invention will become more apparent from the following detailed description of the preferred embodiments taken in conduction with the accompanying drawings.

DESCRIPTION OF THE PREFERRED EMBODIMENTS

Figure 1:
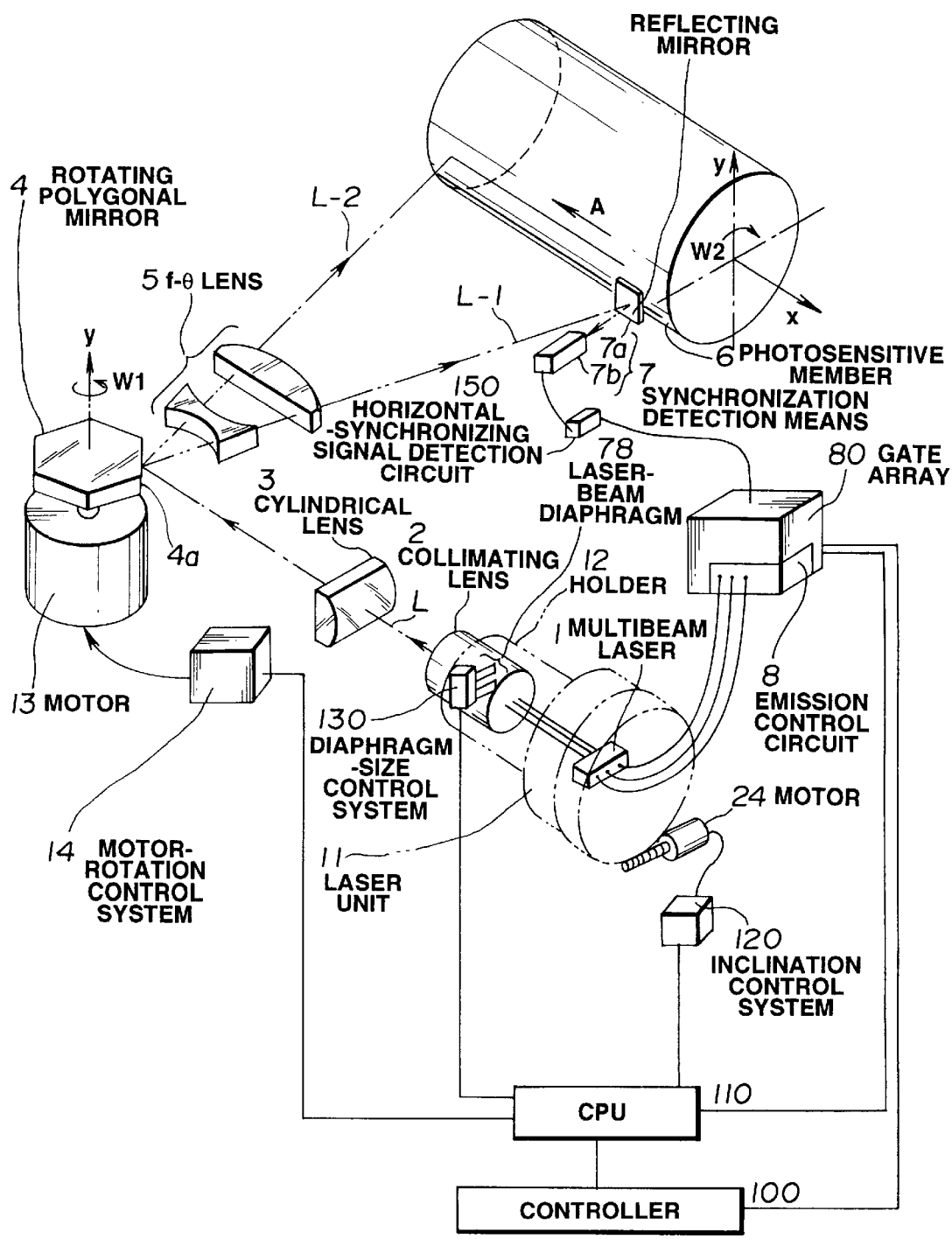
FIG. 1 is a perspective view of a principal portion of an optical scanning apparatus according to a first embodiment of the present invention.

FIG. 1 is a perspective view of a principal portion of an optical scanning apparatus according to a first embodiment of the present invention.

In FIG. 1, light-source means 1 (a multibeam laser) includes a plurality of light-emitting portions which are all preferably arranged in a line, and is fixed within a laser unit 11. The emission timing of a plurality of light beams emitted from the light-source means 1 is controlled by an emission control circuit 8 (to be described later) within a gate array 80.

The light-source means 1 is rotatable substantially around an optical axis L by a motor 24, serving as angle adjusting means (to be described later), and the like. Thus, in the present embodiment, the pitch (scanning interval) of light beams in a direction (the sub-scanning direction) orthogonal to the scanning direction (the main scanning direction, indicated by an arrow A) is variable, so that an image can be obtained in a plurality of resolutions.

A collimating lens 2 makes the plurality of light beams emitted from the light-source means 1 parallel light beams. The collimating lens 2 is fixed to a holder 12 of the laser unit 11.

A cylindrical lens 3 has a predetermined refractive power only in a predetermined direction (the sub-scanning direction). The collimating lens 2 and the cylindrical lens 3 constitute optical means for guiding the plurality of light beams emitted from the light-source means 1 to a light deflector 4, serving as deflection means.

A diaphragm 78 changes the size of each of the light beams emitted from the laser unit 11. The diaphragm 78 is provided within the holder 12. The size of the diaphragm 78 is controlled by a diaphragm-size control system 130.

The light deflector 4 comprises a rotating polygonal mirror, and is driven by driving means, comprising a motor 13 for performing rotatable driving, at a constant speed in a direction indicated by an arrow w1. The number of revolution of the light deflector 4 is controlled by a motor-rotation control system 14.

Imaging means 5, comprising an f-θ lens and the like, condenses the plurality of light beams from the light deflector 4, and images them at different exposure positions on the surface of a photosensitive member 6, serving as a surface to be scanned (a recording medium).

As will be described later, in the present embodiment, if an angle θ is formed between a first line obtained by connecting the imaged positions of the plurality of light beams, which equals the direction of arrangement of the plurality of light beams on the surface to be scanned, and a second line obtained by the scanning line in the scanning direction on the surface. The apparatus is configured such that at least one of the light source means 1, the cylindrical lens 3 and the diaphragm member 78 can be rotated or moved by angle adjusting means so that the angle θ can be changed within a range of 0 (deg)<θ<65 (deg). It is thereby possible to record image information in a plurality of resolutions (recording densities).

The photosensitive member 6 is rotated at a constant speed in a direction indicated by an arrow w2 by a rotating mechanism (not shown). Synchronization detection means 7 is provided at a position where the scanning is started with a light beam L-1. The synchronization detection means 7 comprises a reflecting mirror 7a and horizontal-synchronizing-signal detection means 7b. In order to obtain a horizontal synchronizing signal (BD or "beam detect" signal) for adjusting the timing of the position to start the scanning on the surface of the photosensitive member 6, a part of the light beams deflected and reflected by the light deflector 4 is received by the horizontal-synchronizing-signal detection means 7b via the reflecting mirror 7a.

The emission control circuit 8 controls the emission timing of the light beams emitted from the light-source means 1 in synchronization with the BD signal from a horizontal-synchronizing-signal detection circuit 150.

In the present embodiment, the plurality of (three in the present embodiment) light beams subjected to optical modulation by an image signal, emitted from the light-source means 1, are made substantially parallel light beams, and are incident upon the cylindrical lens 3. The cylindrical lens 3 passes the incident parallel light beams without modifying them in the cross section in the main scanning direction, but converges and images them as a substantially linear image onto a deflecting surface (reflecting surface) 4a of the light deflector 4 in the cross section in the sub-scanning direction.

Respective light beams deflected and reflected by the deflecting surface 4a of the light deflector 4 pass through the imaging means 5, and form respective beam spots at different regions on the surface of the photosensitive member 6, whereby image information is sequentially formed (recorded) on the surface of the photosensitive member 6.

Figure 2A:
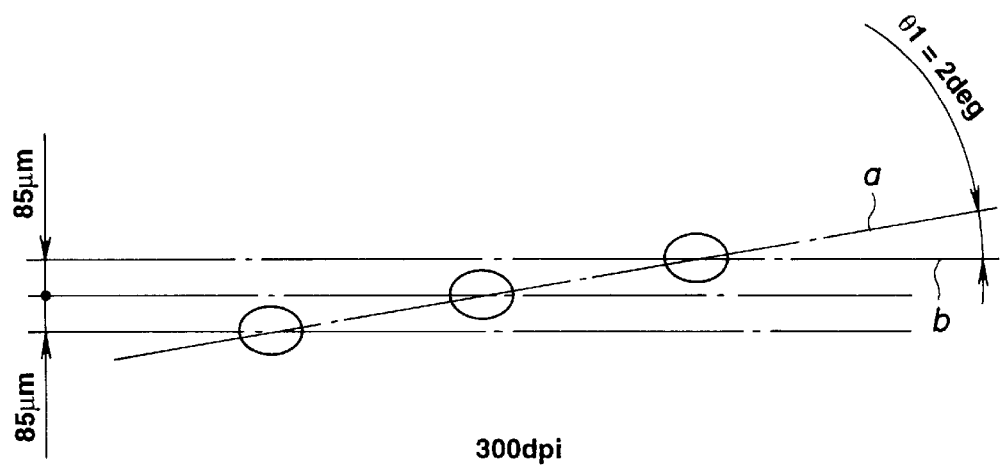
FIGS. 2(A) and 2(B) are diagrams illustrating the positional relationship between light beams on the surface of a photosensitive member.
Figure 2B:
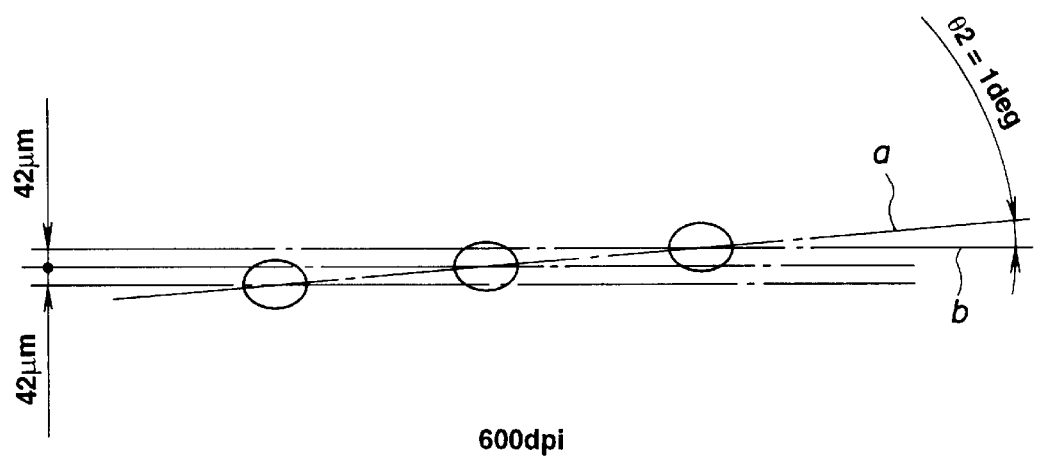

Next, a description will be provided of the method of switching the resolution (recording density) in the sub-scanning direction according to the present embodiment with reference to FIGS. 2(A) and 2(B). Each of FIGS. 2(A) and 2(B) is a diagram illustrating the relationship between the inclination of light beams in the sub-scanning direction and the pitch (scanning interval) of the light beams on the surface of the photosensitive member when each light-source means is disposed inclinedly at an angle θ with respect to the scanning direction.

As shown in FIG. 2(A), in the case of an image having a resolution (recording density) of 300 dpi (dots/inch), the pitch (scanning interval) of light beams is about 85 μm, and the angle of inclination θ1 of the light-source means with respect to the scanning line in the main scanning direction at that time is about 2 degrees. That is, the angle θ1 between a first line "a" connecting imaged positions of a plurality of light beams on the surface of the photosentive member, and a second line b which is the scanning line in the scanning direction, is about 2 degrees when the resolution is 300 dpi.

On the other hand, as shown in FIG. 2(B), in the case of an image having a resolution (recording density) of 600 dpi, the pitch (scanning interval) of light beams is about 42 μm, and the angle of inclination θ2 of the light source means with respect to the scanning line in the scanning direction is about 1 degree.

Accordingly, in the present embodiment, when switching from a resolution of 300 dpi to a resolution of 600 dpi, the angle of inclination of projected light beams on the surface of the photosensitive member 6 is changed by rotating the laser unit 11, in which the light-source means 1 is fixed, around the optical axis by about 1 degree from a predetermined position (a position corresponding to the resolution of 300 dpi) using the angle adjusting means (rotation means), whereby the pitch (scanning interval) of the light beams in the sub-scanning direction is changed to obtain an image having a resolution of 600 dpi.

The rotation angle in the above-described example (or the following example) corresponds to a case in which the emission interval of the multibeam laser is about 100 μm, and the lateral magnification of the optical system for imaging light beams onto the photosensitive member is about 20.

That is, in this optical system, the interval between imaged positions on the photosensitive member in the scanning direction is 100 (μm)×20=2000 (μm), and the scanning interval in the case of 600 dpi is about 42 (μm). Hence, $\theta 2 = \tan^{-1}(42/2000) = 1.2$ (deg).

The emission interval of a multibeam laser is, in most cases, greater than about 50 μm. Hence, if the minimum resolution is assumed to be 240 dpi, the scanning interval is about 106 μm. If the resolution increases to 1200 dpi, the scanning interval is reduced to about 21 μm.

On the other hand, since the lateral magnification of the optical system is greater than 1, the following value is sufficient for the range of rotation of the angle adjusting means:

$0 < \theta < \tan^{-1}(106/50)$ 65 (deg).

The foregoing angular adjustment is sufficient to switch resolution in the sub-scanning direction. Switching resolution in the main scanning direction may be performed, for example, by changing the emission interval of light beams, i.e., the image clock frequency, as described above.

Figure 3:
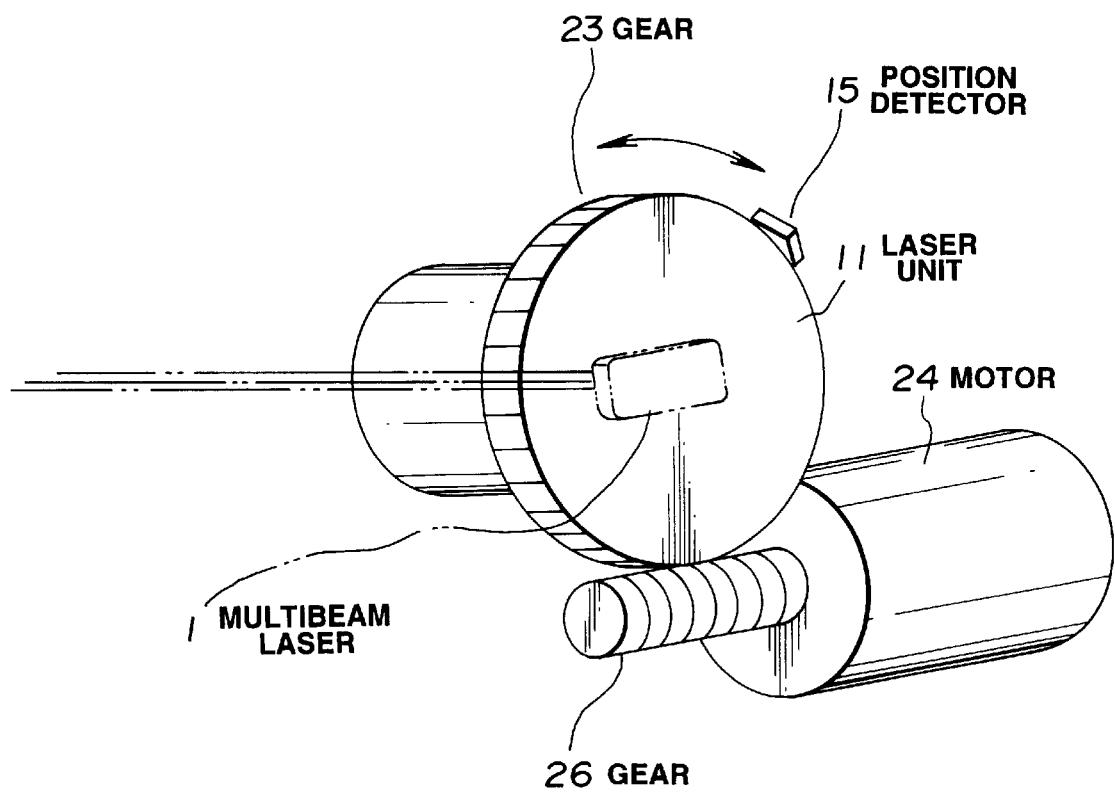
FIG. 3 is a perspective view of a principal portion of the neighborhood of light-source means shown in FIG. 1.
Figure 4:
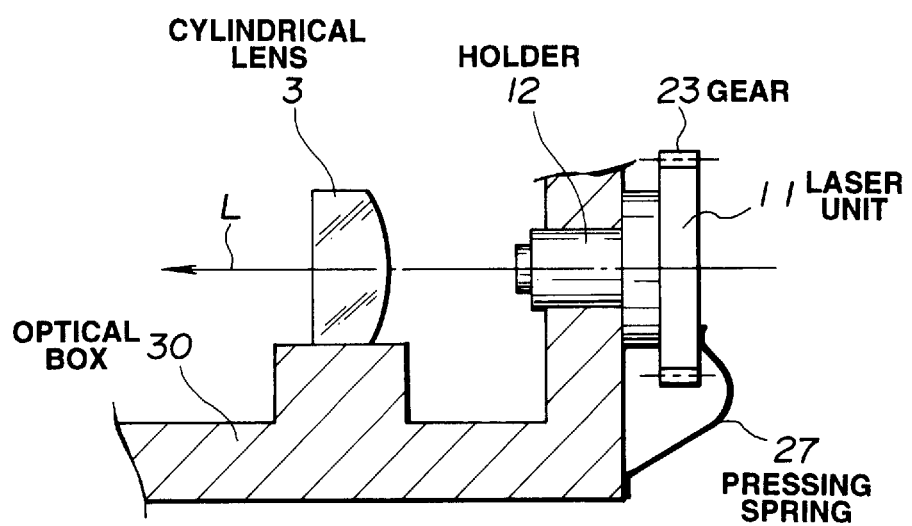
FIG. 4 is a cross-sectional view of a principal portion of FIG. 3.

Next, a description will be provided of the configuration and the operation of the angle adjusting means (rotation means) for rotating the laser unit 11 with reference to FIGS. 3 and 4. FIG. 3 is a perspective view illustrating a principal portion of the neighborhood of the light-source means, and FIG. 4 is a cross-sectional view of a principal portion of FIG. 4.

As shown in FIG. 3, a gear 23 is cut on the outer circumference of the laser unit 11. The gear 23 is engaged with a gear 26 cut on the output shaft of the motor 24, whereby the laser unit 11 can be rotated around the optical axis by the forward/reverse rotation of the motor 24.

If the center of the rotation is shifted from the center of the optical axis, imaged positions on the photosensitive member deviate in a direction perpendicular to the scanning direction (the sheet-feeding direction). This deviation can be allowed to a certain degree (within the range of aberration), and therefore the laser unit 11 may be rotated substantially around the center of the optical axis.

A position detector (photodetector) 15, serving as position detection means, for detecting the rotation position of the laser unit 11 is provided at a position in the vicinity of the outer circumference of the laser unit 11. The position detector 15 is configured such that, for example, a home position (for example, a position corresponding to a resolution of 300 dpi) and a position to switch the resolution (a position corresponding to a resolution of 600 dpi) can be detected.

As shown in FIG. 4, the holder 12 of the laser unit 11 is fitted to an optical box 30, to which the cylindrical lens 3 and the like are fixed, and is pressed in the direction of the optical axis L by a pressing spring 27 and the like.

In the present embodiment, image information can be recorded not only with the two resolutions 300 dpi and 600 dpi, but also with other resolutions (for example, 400 dpi and the like). In such cases, the laser unit 11 may be rotated by angles corresponding to respective resolutions.

For example, in an image having a resolution of 400 dpi, an image having a high picture quality correponding to this resolution can be obtained by rotating the laser unit 11 around the optical axis by about 0.5 degrees from a position corresponding to an image having a resolution of 300 dpi (a home position) in a predetermined direction.

As described above, in the present embodiment, by rotating the light-source means 1 by the angle adjusting means so that the angle of inclination θ of light beams projected onto the photosensitive member 6 changes in accordance with the resolution, the pitch (scanning interval) of the light beams in the sub-scanning direction can be changed, whereby image information can be recorded in a plurality of resolutions.

Figure 5:
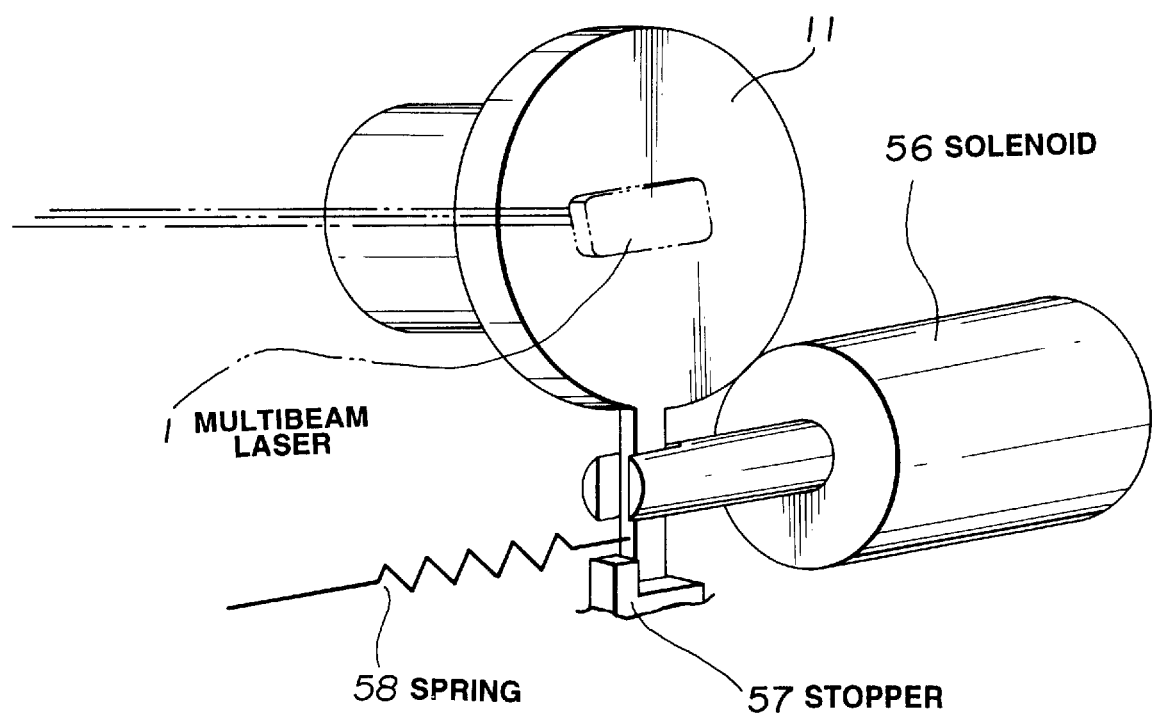
FIG. 5 is a perspective view of a principal portion of the neighborhood of the light-source means shown in FIG. 1.

As described above, in the present embodiment, the laser unit 11 can be rotated using the angle adjusting means, comprising the gear 23, the motor 24 and the like. However, when it is only necessary to switch between two resolutions, as shown in FIG. 5, the angle adjusting means may be configured by a solenoid 56 and the like.

In such a case, a stopper 57 is provided at a position corresponding to an angle required to switch the resolution, and a spring 58 for driving is provided at a side opposite to the solenoid 56. It is thereby possible to reduce the cost of the apparatus.

Figure 6:
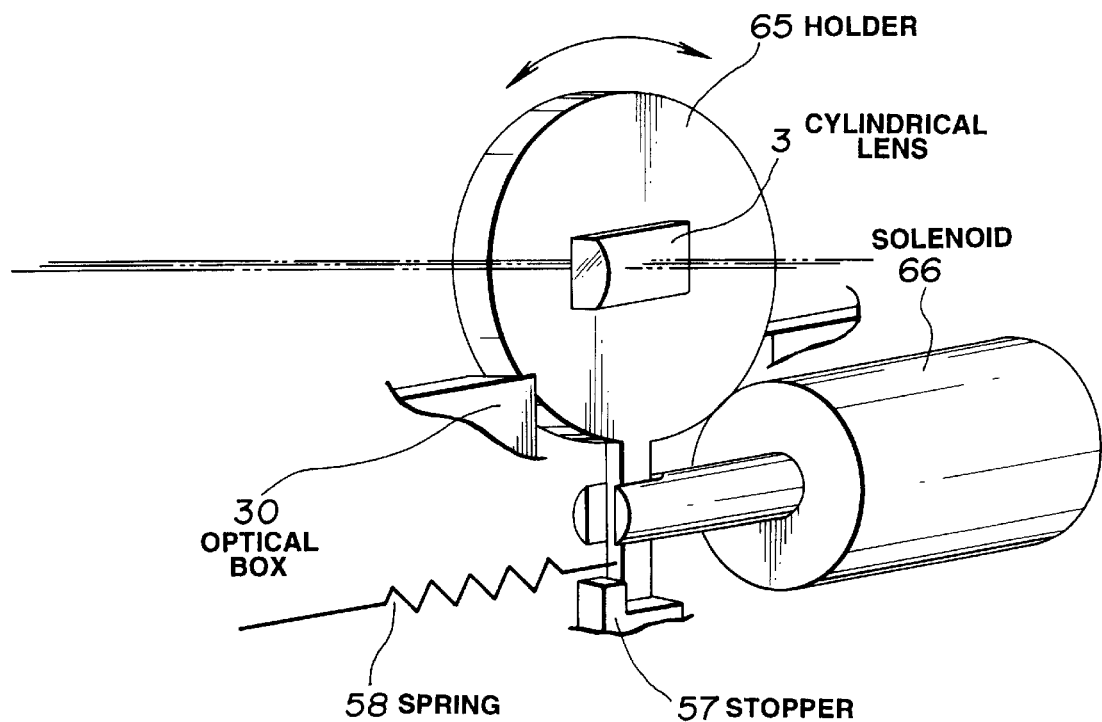
FIG. 6 is a perspective view of a principal portion of the neighborhood of optical means according to a second embodiment of the present invention.

FIG. 6 is a perspective view of a principal portion of the neighborhood of a cylindrical lens 3 according to a second embodiment of the present invention. In FIG. 6, the same components as those shown in FIG. 1 are indicated by the same reference numerals.

The present embodiment differs from the above-described first embodiment in that images having a plurality of resolutions are obtained by rotating the cylindrical lens 3, instead of the laser unit 11, around its optical axis in a predetermined direction by angle adjusting means (rotation means), comprising a solenoid 66 and the like. Other components and optical functions are substantially the same as in the first embodiment.

That is, in the present embodiment, as shown in FIG. 6, the cylindrical lens 3 is held by an S holder 65. By rotating the S holder 65 in a predetermined direction using the solenoid 66, a cam (not shown) and the like, an image having a desired resolution is obtained.

As described above, the cylindrical lens 3 has a predetermined refractive power only in one direction (the sub-scanning direction). Hence, by rotating the cylindrical lens 3, the angle of inclination of light beams on the surface of the photosensitive member 8 changes, whereby the pitch (scanning interval) of light beams in the sub-scanning direction can be changed. Thus, as in the first embodiment, the resolution can be switched, and a plurality of images corresponding to respective resolutions can be obtained.

Figure 7:
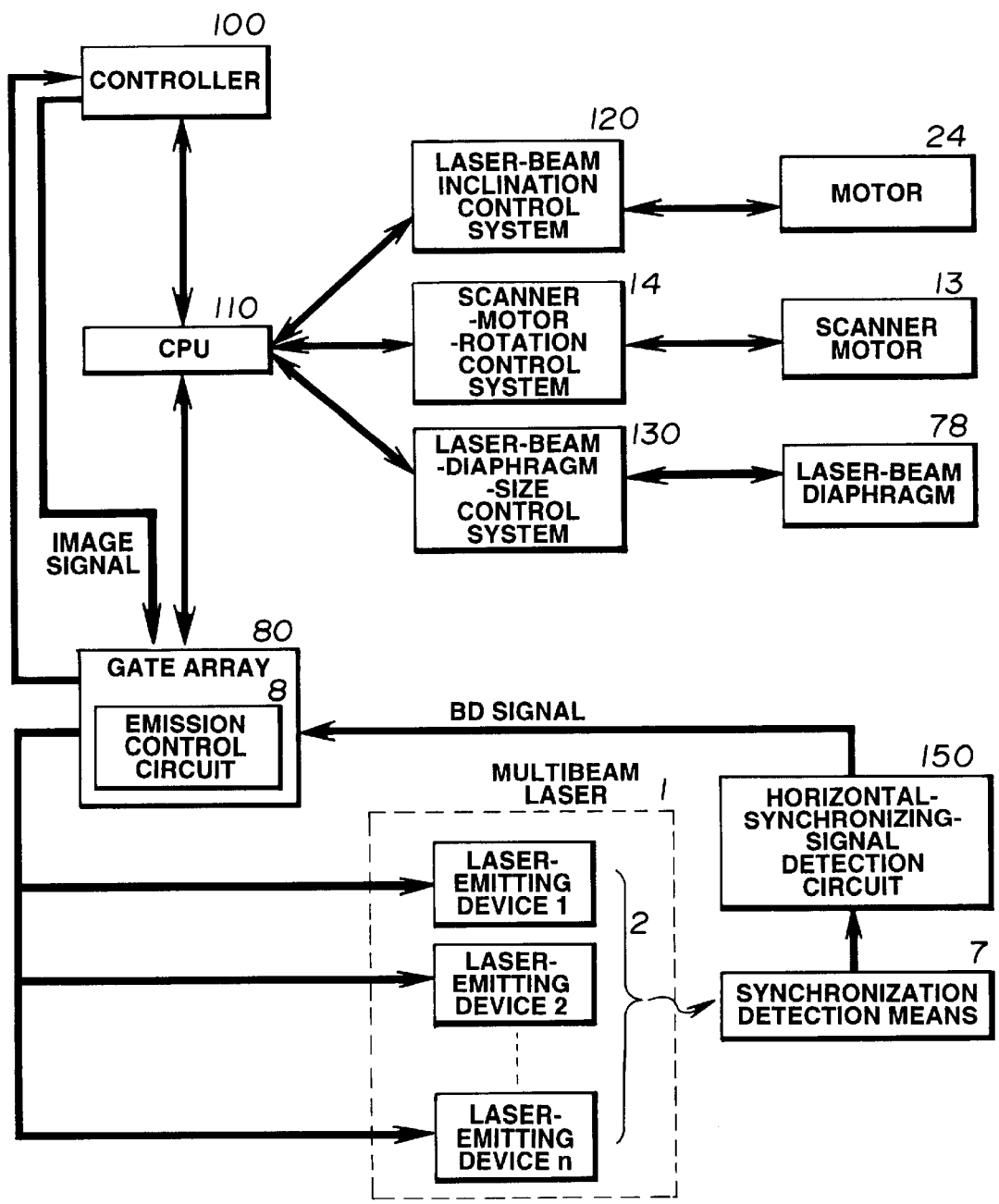
FIG. 7 is a block diagram illustrating a control method when switching the resolution.

FIG. 7 is a block diagram illustrating a control method when switching the resolution in the optical scanning apparatus in the first embodiment shown in FIG. 1.

When a signal to request the switching of the resolution is input to a CPU (central processing unit) 110 of a printing apparatus from a controller 100, the CPU 110 controls respective control systems in accordance with the requested resolution. That is, in order to change the angle of inclination of the multibeam laser 1 in accordance with the resolution, a signal is transmitted to an inclination control system 120, and the laser unit 11 is changed to predetermined angle and position by driving the motor 24. Similarly, the number of revolution of the scanner motor 13, and the size of the laser-beam diaphragm 78 are changed in accordance with the resolution.

After the above-described preparation has been completed, the CPU 110 transmits a signal indicating the completion of preparation to the controller 100.

A printing operation is performed in the same manner as in the case of an ordinary single light source. That is, a print request signal is transmitted to the controller 100, and a printing operation is started in response to the signal. At that time, since a plurality of light beams are emitted, a synchronizing signal ("BD" signal) is detected at every emission of a light-emitting portion. This BD signal is transmitted to the controller 100 via the gate array 80. An image signal is transmitted from the contoller 100 in synchronization with the BD signal, and the corresponding light-emitting portion is emitted in accordance with the image signal.

Although in the above-described embodiment the pitch (scanning interval) of light beams in the sub-scanning direction is changed by rotating the laser unit 11 or the cylindrical lens 3, the pitch (scanning interval) of light beams in the sub-scanning direction may be changed only by a diaphragm member.

A description will now be provided of an embodiment which adopts such an approach.

Figure 8:
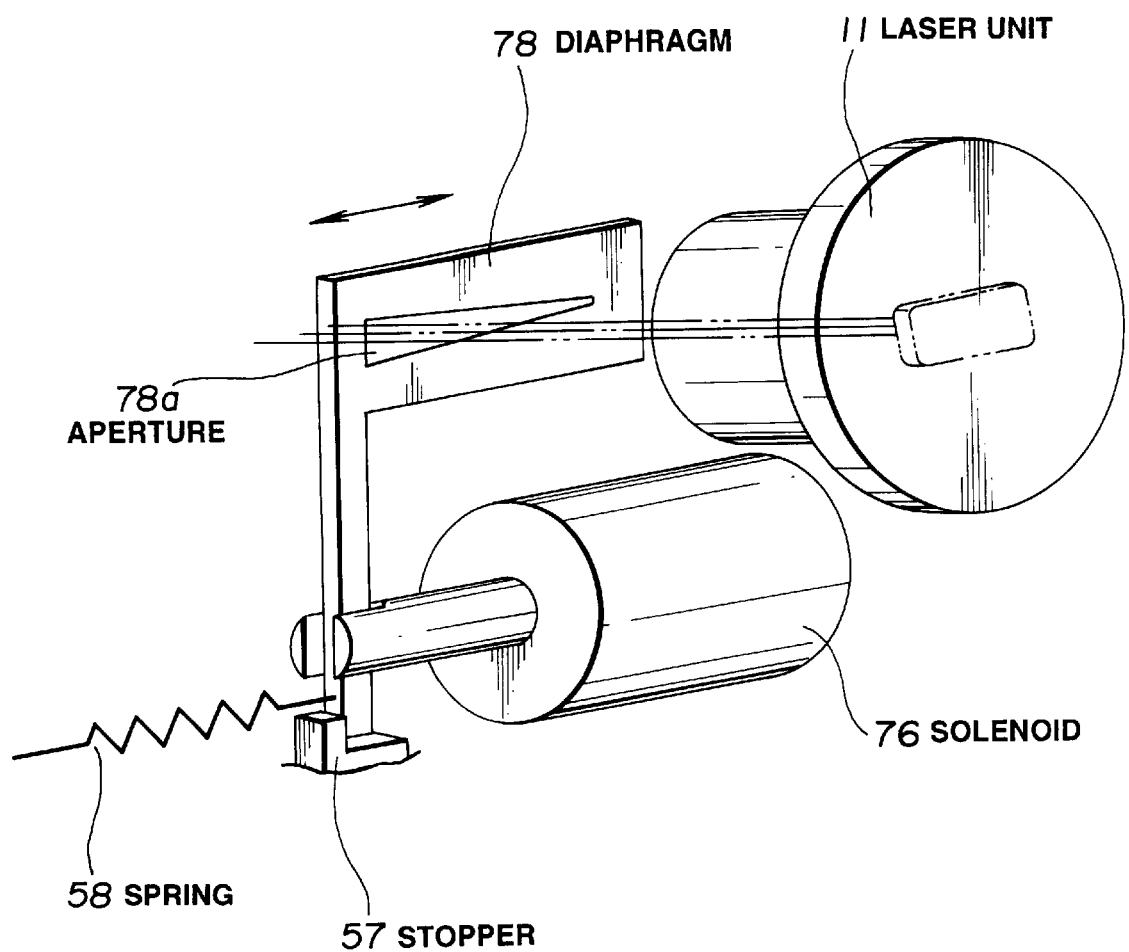
FIG. 8 is a perspective view of a principal portion of the neighborhood of a diaphragm member according to a third embodiment of the present invention.

FIG. 8 is a perspective view of a principal portion of the neighborhood of a diaphragm member 78, which is provided in front of the laser unit 11, according to a third embodiment of the present invention. In FIG. 8, the same components as those shown in FIGS. 3 and 6 are indicated by the same reference numerals.

The present embodiment differs from the above-described second embodiment in that images having a plurality of resolutions can be obtained by moving the diaphragm 78 in a predetermined direction within a plane perpendicular to the optical axis of the laser unit 11 by angle adjusting means, comprising a solenoid 76 and the like. Other components and optical functions are substantially the same as in the second embodiment.

That is, in the present embodiment, by providing the diaphragm 78 having an aperture 78a, nonparallel in the scanning direction, in front of the laser unit 11, and moving the diaphragm 78 in a predetermined direction within a plane perpendicular to the optical axis of the laser unit 11 by the angle adjusting means, the size of each laser beam emitted from the laser unit 11 is continuously changed. Thus, as shown in FIG. 9, the distance between the centers of adjacent light beam spots for scanning the surface of the photosensitive member 8 is changed, whereby the pitch (scanning interval) of light beams in the sub-scanning direction is changed, and images having a plurality of resolutions can be obtained.

Figure 9A:
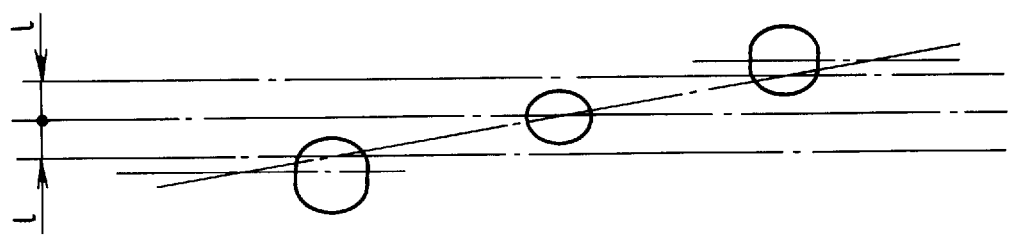
FIGS. 9(A) and 9(B) are diagrams illustrating the positional relationship between light beams on the surface of a photosensitive member in the third embodiment.
Figure 9B:
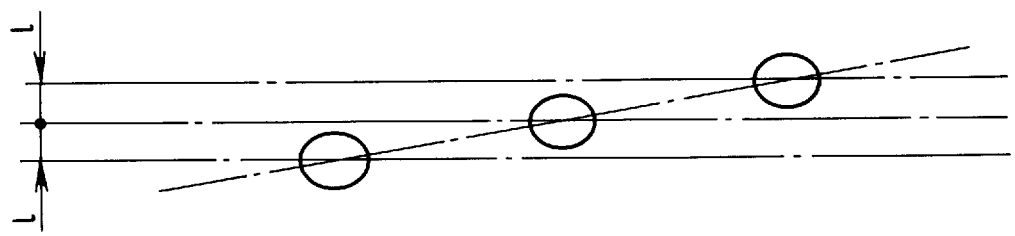

As described above, in the present embodiment, the distance between adjacent light beam spots formed on the surface of the photosensitive member 8 and the size of each light beam spot can be changed. Hence, by arranging the apparatus such that the spot size is increased, as shown in FIG. 9(A), by increasing the size of the diaphragm in the case of a low resolution such as 300 dpi or the like, and the spot size is reduced, as shown in FIG. 9(B), by reducing the size of the diaphragm in the case of a high resolution such as 600 dpi or the like, not only the pitch of light beams in the sub-scanning direction can be changed, but also optical scanning can be perforemd with a spot size corresponding to the resolution, whereby low-density portions are not produced between scanning lines, and therefore an image having an excellent picture quality can be obtained.

Although in the present embodiment the diaphragm 78 having the nonparallel aperture 78a is used, the same effects as in the above-described third embodiment may be obtained by using a diaphragm member having a plurality of apertures having different sizes.

By using the above-described motor, cam and the like instead of the solenoid 76 as the angle adjusting means, the size of light beam spots can be arbitrarily changed.

Figure 10:
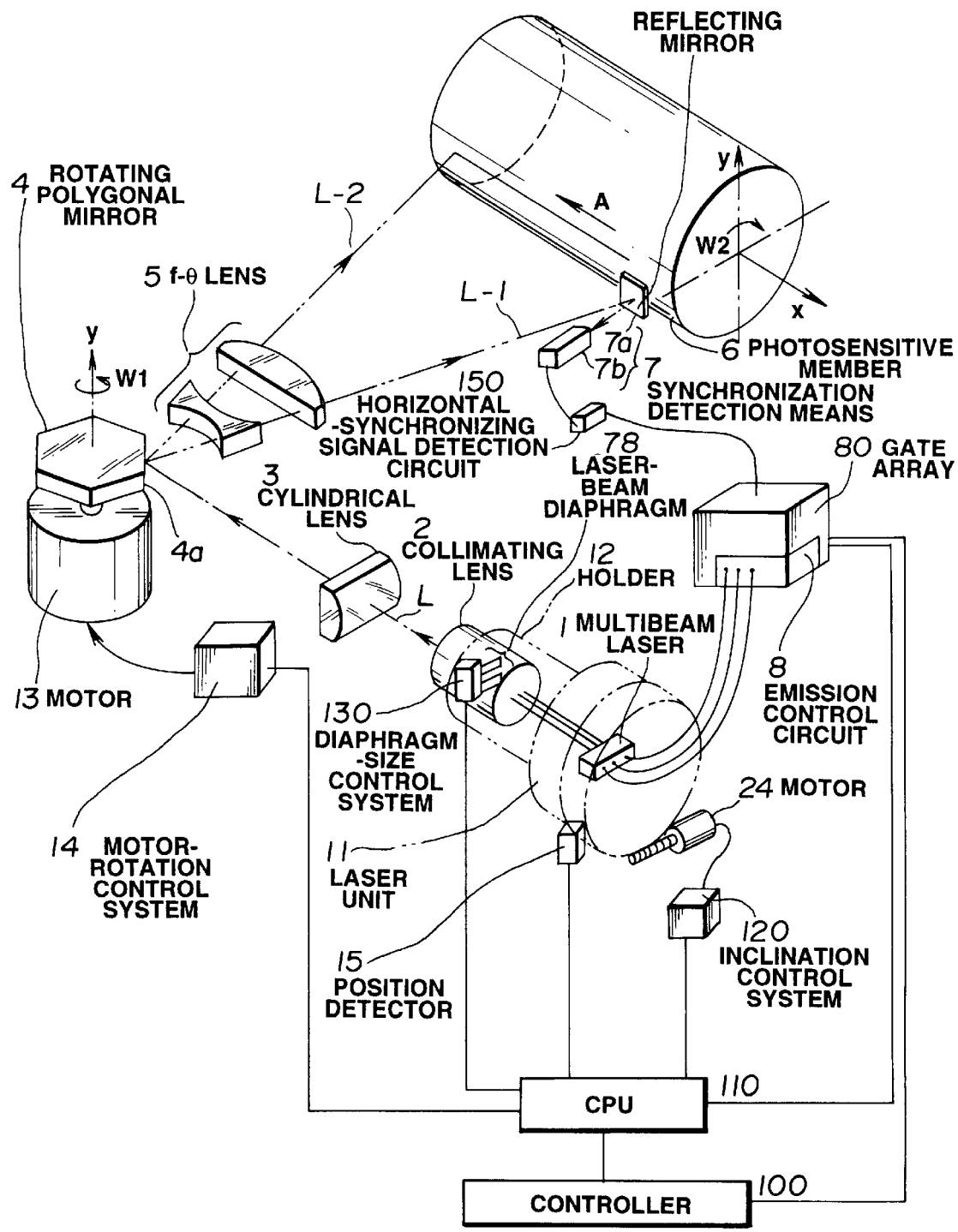
FIG. 10 is a perspective view of a principal portion of an optical scanning apparatus according to a fourth embodiment of the present invention.

FIG. 10 is a perspective view of a principal portion of an optical scanning apparatus according to a fourth embodiment of the present invention. In FIG. 10, the same components as those shown in FIG. 1 are indicated by the same reference numerals, and a description thereof will be omitted.

The present invention is an improvement of the above-described first embodiment. In the present embodiment, position deviation on one vertical line in the sub-scanning direction (synchronization deviation of a plurality of light beams in the horizontal direction) produced when switching the resolution is corrected in the following manner.

Figure 11:
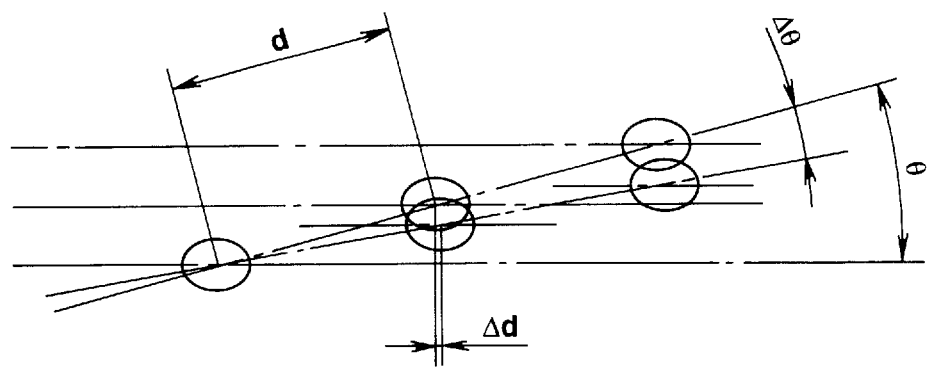
FIG. 11 is a diagram illustrating deviation of light beams and the amount of correction on the surface of a photosensitive member in the fourth embodiment.

That is, as in the present embodiment, if the angle of inclination of a plurality of light beams in the sub-scanning direction is changed in accordance with the resolution, synchronization of respective light beams in the horizontal direction (main scanning direction) deviates, as shown in FIG. 11.

Figure 12:
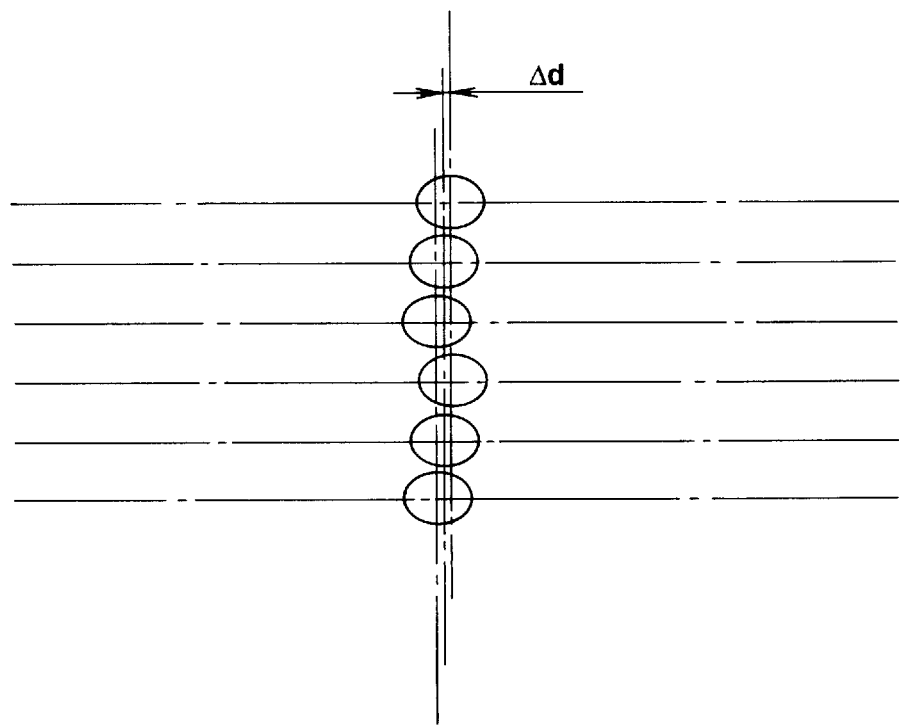
FIG. 12 is a diagram illustrating deviation of light beams in the sub-scanning direction on the surface of the photosensitive member in the fourth embodiment.

When, for example, the present invention is applied to an optical scanning apparatus, such as a laser-beam printer (LBP) or the like, if synchronization in the horizontal direction deviates, one line in the vertical direction (sub-scanning direction) fluctuates as shown in FIG. 12, thereby degrading the picture quality of the obtained image.

In the present embodiment, the position after rotation when the laser unit 11 is rotated by the angle adjusting means is detected by a position detector 15, the amount of deviation of each light beam in the horizontal direction is calculated from the detected amount of rotation, and the emission timing of a plurality of light beams emitted from the light-source means 1 is controlled by the emission control circuit 8, whereby position deviation on one vertical line in the sub-scanning direction is corrected.

Referring to FIG. 11, if the pitch of light beams is represented by d, the angle of inclination of the light beams is represented by θ, the angle of rotation of the lasere unit 11 rotated in accordance with the resolution is represented by Δθ, the amount of deviation Δd is expressed by:

$$\Delta d = \cos(\theta - \Delta\theta) - \cos\theta.$$

By controlling the emission timing of a plurality of light beams emitted from the light-source means 1 based on the amount of deviation Δd, position deviation on one vertical line in the sub-scanning direction can be prevented.

That is, when the leading BD signal from the synchronization detection means 7 is input to the emission control circuit 8 linked with the position detector 15, the emission control circuit 8 causes the light-source means 1 to emit light beams sequentially shifting the emission timing by a time period corresponding to the amount of deviation Δd, whereby light beams can be synchronized in the horizontal direction. It is thereby possible to correct position deviation on one vertical line in the sub-scanning direction, and to obtain an excellent image.

Figure 13:
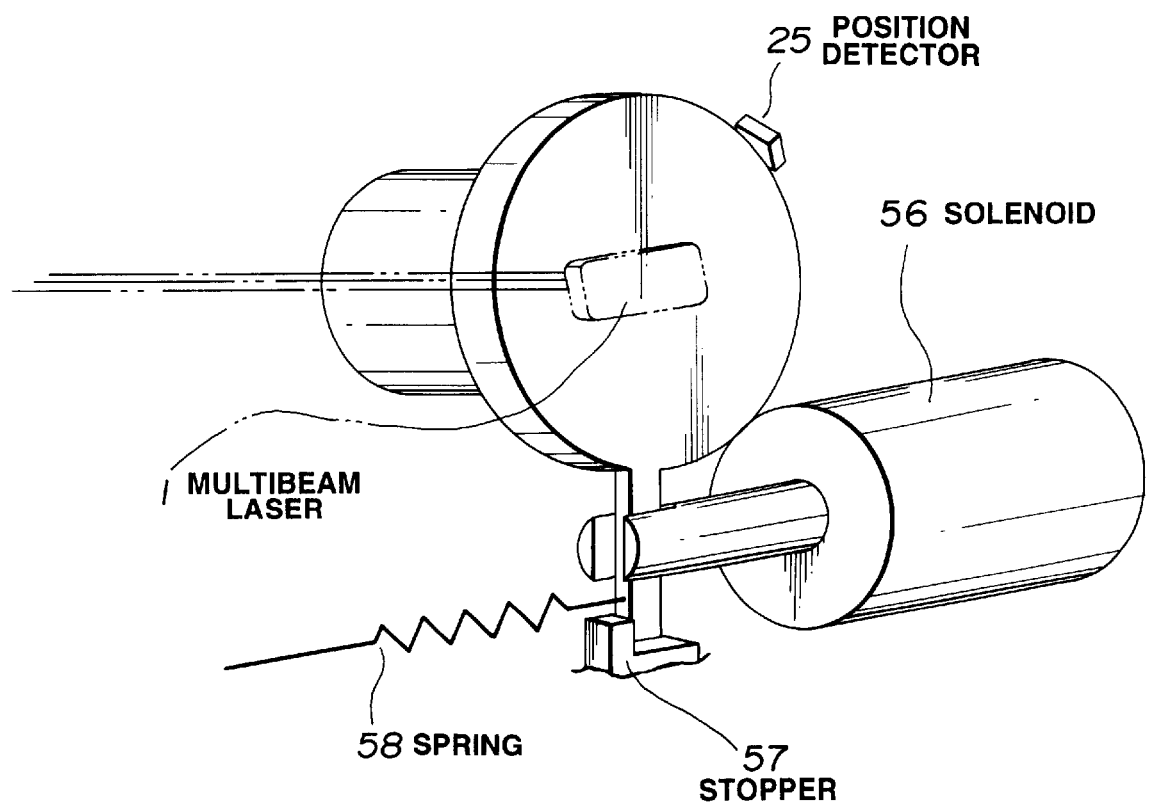
FIG. 13 is a perspective view of a principal portion of the neighborhood of light-source means in the fourth embodiment.

As in the first embodiment, in the present embodiment, if it is only necessary to switch between two resolutions, as shown in FIG. 13, the angle adjusting means may comprise a solenoid 56, a stopper 57, and the like instead of the motor 14, the gear 13, and the like.

When using the solenoid 56, the solenoid 56 may also function as position detection means for detecting the rotation position of the laser unit 11 utilizing on-off signals of the solenoid 56. It is thereby possible to provide an apparatus without using the position detector 25.

Figure 14:
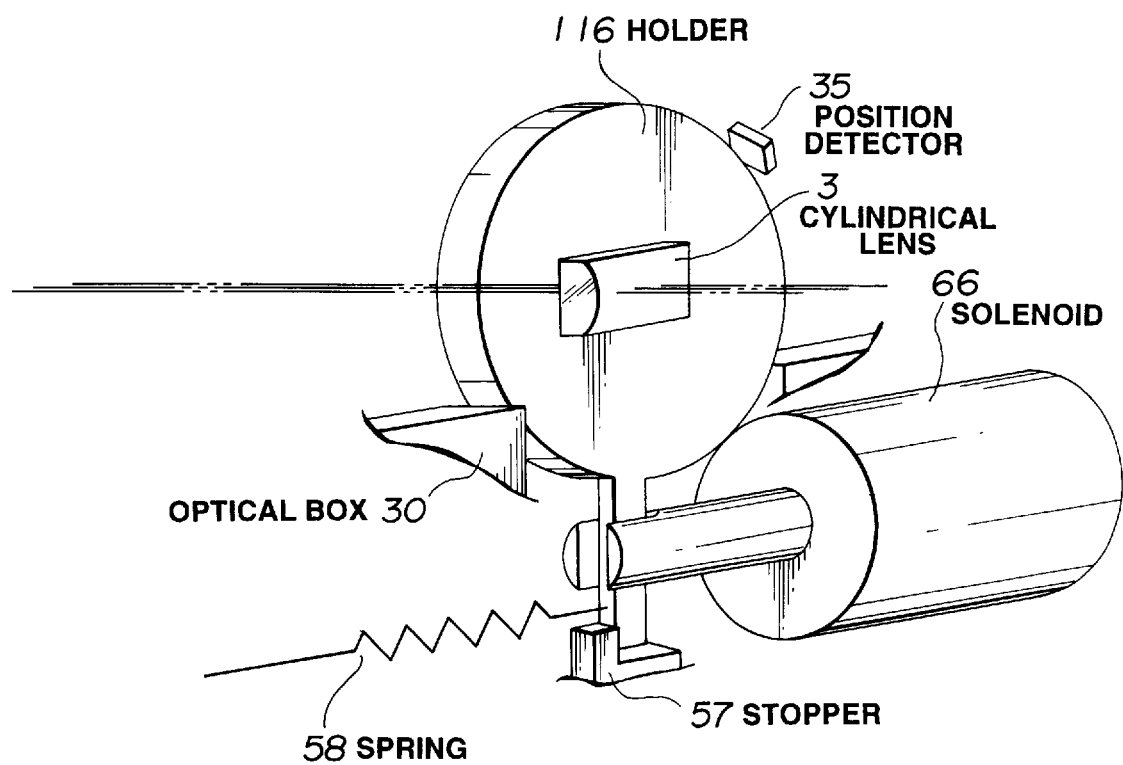
FIG. 14 is a perspective view of a principal portion of the neighborhood of optical means according to a fifth embodiment of the present invention.

FIG. 14 is a perspective view of a pricipal portion of the neighborhood of a cylindrical lens 3 according to a fifth embodiment of the present invention. In FIG. 14, the same components as those shown in FIG. 6 are indicated by the same reference numerals.

The present invention is an improvement of the above-described second embodiment. In the present embodiment, position deviation on one vertical line in the sub-scanning direction produced when switching the resolution is corrected in the following manner.

That is, a position detector 35, serving as position detection means, for detecting the rotation position of an S holder 116 is provided at a position in the vicinity of the outer circumference of the S holder 116. As in the above-described fourth embodiment, the emission control circuit 8 is controlled by linking the position detector 35 with the synchronization detection means 7, and the emission timing of a plurality of light beams emitted from the light-source means 1 is controlled by the emission control circuit 8. It is thereby possible to correct position deviation on one vertical line in the sub-scanning direction caused by the switching of the resolution, and to obtain an image having an excellent quality corresponding to the resolution.

Other components and optical functions are substantially the same as in the above-described second embodiment, and the same effects as in the second embodiment can be obtained.

As in the above-described fourth embodiment, in the present embodiment, the rotation position of the laser unit 11 may be detected utilizing on-off signals of the solenoid 66.

Figure 15:
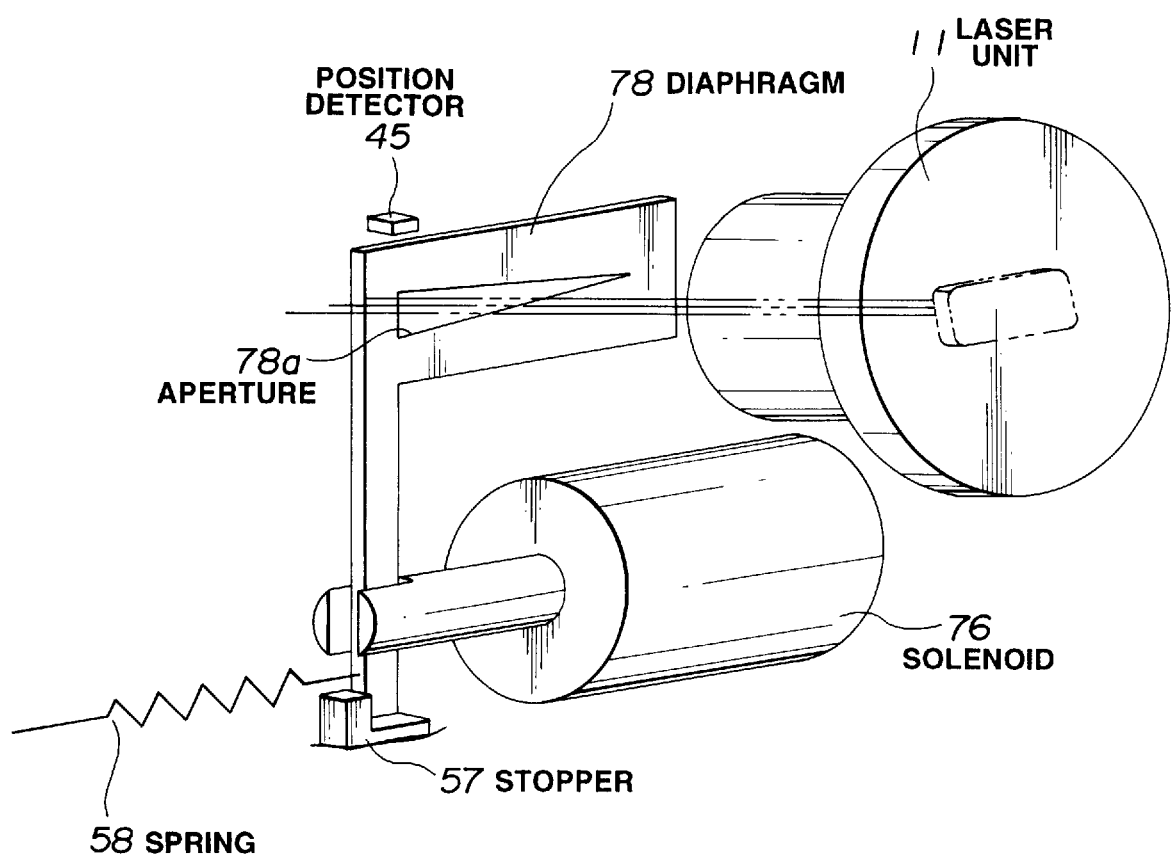
FIG. 15 is a perspective view of a principal portion of the neighborhood of a diaphragm member according to a sixth embodiment of the present invention.

FIG. 15 is a perspective view of a principal portion of the neighborhood of a diaphragm member 78, which is provided in front of a laser unit 11, according to a sixth embodiment of the present invention. In FIG. 15, the same components as those shown in FIG. 8 are indicated by the same reference numerals.

The present embodiment is an improvement of the above-described third embodiment. In the present embodiment, position deviation on one vertical line in the sub-scanning direction produced when switching the resolution is corrected in the following manner.

That is, a position detector 45, serving as position detection means, for detecting the position of a diaphragm 78 after being moved is provided in the vicinity of the diaphragm 78. As in the above-described fourth embodiment, the emission control circuit 8 is controlled by linking the position detector 45 with the synchronization detection means 7, and the emission timing of a plurality of light beams emitted from the light-source means 1 is controlled by the emission control circuit 8. It is thereby possible to correct position deviation on one vertical line in the sub-scanning direction caused by the switching of the resolution, and to obtain an image having an excellent quality corresponding to the resolution.

Other components and optical functions are substantially the same as in the above-described third embodiment, and the same effects as in the third embodiment can be obtained.

Next, a description will be provided of a method for controlling the apparatus according to the present embodiment. As described above, when a signal for switching the resolution has been transmitted from an external apparatus, such as a host computer or the like, to the above-described angle adjusting means, at least one of the light-source means (laser unit), the optical means (cylindrical lens), the diaphragm member and the like operates in accordance with the resolution, and the pitch (scanning interval) of light beams in the sub-scanning direction, and the size of light-beam spots change in accordance with the resolution.

Accordingly, the switching of the resolution can be easily performed in each product or unit, and can also be performed for each page.

Although in the foregoing embodiments a description has been provided of a case in which the light-source means (multibeam laser) emits three light beams, the same effects as those in the foregoing embodiments may, of course, be obtained, provided that the light-source means emits at least two light beams, i.e., a plurality of light beams.

Although in the above-described embodiments at least one of the light-source means, the cylindrical lens and the diaphragm member is rotated or moved by the angle adjusting means, the present invention is also effective when these components are relatively displaced.

As described above, according to the present invention, by arranging such that at least one of light-source means, optical means and a diaphragm member can be rotated or moved by angle adjusting means, the pitch (scanning interval) of light beams in the sub-scanning direction and the size of light beams spots can be arbitrarily changed in accordance with the resolution, and the resolution can be changed, for example, for each page, so that it is possible to provide an optical scanning apparatus, in which an image corresponding to application, such as software or the like, can be obtained, and a high-quality image corresponding to the resolution can be obtained.

According to the present invention, by arranging such that at least one of light-source means, optical means and a diaphragm member can be rotated or moved by angle adjusting means, and the position after rotation or movement is detected by position detection means, the pitch (scanning interval) of light beams in the sub-scanning direction and the size of light beam spots can be arbitrarily changed, and the resolution can be changed for each page. Hence, it is possible to provide an optical scanning apparatus, in which an image corresponding to application, such as software or the like, can be obtained, position deviation on one vertical line in the sub-scanning direction caused by the switching of the resolution can be easily corrected, and a high-quality image corresponding to the resolution can be obtained.

The individual components shown in outline or designated by blocks in the drawings are all well known in the optical scanning apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical scanning apparatus for scanning plural light beams modulated with image information in a selectable one of at least two different image resolutions, said optical scanning apparatus comprising:

light-source means including a plurality of light-emitting portions which emit respective ones of plural light beams;

scanning means for scanning a predetermined surface in a scanning direction, said scanning means scanning the predetermined surface with the plural light beams from said light-source means by deflecting the plural light beams;

optical means disposed in an optical path between said light-source means and said scanning means; and angle adjusting means for automatically changing an angle θ between a direction in which images of the plural light beams are arranged on the predetermined surface and the scanning direction in which the plural light beams are scanned on the predetermined surface, the angle θ being changed automatically in correspondence to the selected resolution.

2. An apparatus according to claim 1, wherein said angle adjusting means rotates said light-source means.

3. An apparatus according to claim 1, wherein said angle adjusting means rotates said optical means.

4. An apparatus according to claim 1, wherein said angle adjusting means moves said optical means.

5. An apparatus according to claim 1, wherein said plural light beams are modulated with image information at the selected resolution.

6. An apparatus according to claim 1, wherein the plural light beams are deflected at a speed corresponding to the selected resolution.

7. An apparatus according to claim 1, wherein spot size of the scanned plural beams is set in correspondence to the selected resolution.

8. An optical scanning apparatus for scanning plural light beams modulated with image information in a selectable one of at least two different image resolutions, said optical scanning apparatus comprising:

light-source means including a plurality of light emitting portions which emit respective ones of plural light beams;

scanning means for scanning a predetermined surface in a scanning direction, said scanning means scanning the predetermined surface with the plural light beams from said light-source means by deflecting the plural light beams; and angle adjusting means for automatically changing an angle θ between a direction in which images of the plural light beams are arranged on the predetermined surface and the scanning direction in which the plural light beams are scanned on the predetermined surface, the angle θ being changed automatically in correspondence to the selected resolution.

9. An apparatus according to claim 8, wherein said plural light beams are modulated with image information at the selected resolution.

10. An apparatus according to claim 8, wherein the plural light beams are deflected at a speed corresponding to the selected resolution.

11. An apparatus according to claim 8, wherein spot size of the scanned plural beams is set in correspondence to the selected resolution.

12. An optical scanning apparatus for scanning plural light beams modulated with image information in a selectable one of at least two different image resolutions, said optical scanning apparatus comprising:

light-source means including a plurality of light-emitting portions which emit respective ones of plural light beams;

rotation means for automatically rotating said light-source means in correspondence to the selected resolution; and deflection means for deflecting the plural light beams from said light-source means.

13. An apparatus according to claim 12, wherein said plural light beams are modulated with image information at the selected resolution.

14. An apparatus according to claim 12, wherein the plural light beams are deflected at a speed corresponding to the selected resolution.

15. An apparatus according to claim 12, wherein spot size of the scanned plural beams is set in correspondence to the selected resolution.

16. An optical scanning apparatus for scanning plural light beams modulated with image information in a selectable one of at least two different image resolutions, said optical scanning apparatus comprising:

optical means including a plurality of light-emitting portions which emit respective ones of plural light beams;

rotation means for automatically rotating at least a part of said optical means in correspondence to the selected resolution; and deflection means for deflecting the plural light beams from said optical means.

17. An apparatus according to claim 16, wherein said plural light beams are modulated with image information at the selected resolution.

18. An apparatus according to claim 16, wherein the plural light beams are deflected at a speed corresponding to the selected resolution.

19. An apparatus according to claim 16, wherein spot size of the scanned plural beams is set in correspondence to the selected resolution.

20. An optical scanning apparatus for scanning plural light beams modulated with image information in a selectable one of at least two different image resolutions, said optical scanning apparatus comprising:

light-source means including a plurality of light-emitting portions which emit respective ones of plural light beams;

emission control means for controlling the plurality of light-emitting portions;

scanning means for scanning a predetermined surface in a scanning direction, said scanning means scanning the predetermined surface with the plural light beams from said light-source means by deflecting the plural light beams;

optical means disposed in an optical path between said light-source means and said scanning means;

synchronization detection means for detecting the timing of the start of light beam scanning on the predetermined surface;

angle adjusting means for automatically changing an angle $\theta$ between a direction in which images of the plural light beams are arranged on the predetermined surface and the scanning direction in which the plural light beams are scanned on the predetermined surface, the angle $\theta$ being changed automatically in correspondence to the selected resolution;

position detection means for detecting position information relating to a position adjusted by said angle adjusting means; and control means for controlling said emission control means by linking said synchronization detection means with said position detection means.

21. An apparatus according to claim 20, wherein said angle adjusting means rotates said light-source means, and wherein said position detection means detects angular position after the rotation.

22. An apparatus according to claim 20, wherein said angle adjusting means rotates said optical means, and wherein said position detection means detects angular position after the rotation.

23. An apparatus according to claim 20, wherein said angle adjusting means moves said optical means, and wherein said position detection means detects a position after the movement.

24. An apparatus according to claim 20, wherein said plural light beams are modulated with image information at the selected resolution.

25. An apparatus according to claim 20, wherein the plural light beams are deflected at a speed corresponding to the selected resolution.

26. An apparatus according to claim 20, wherein spot size of the scanned plural beams is set in, correspondence to the selected resolution.

27. An optical scanning apparatus for scanning plural light beams modulated with image information in a selectable one of at least two different image resolutions, said optical scanning apparatus comprising:

light-source means including a plurality of light-emitting portions which emit respective ones of plural light beams;

emission control means for controlling the plurality of light-emitting portions;

scanning means for scanning a predetermined surface in a scanning direction, said scanning means scanning the predetermined surface with the plural light beams from said light-source means by deflecting the plural light beams;

synchronization detection means for detecting the timing of the start of the scanning on the predetermined surface; and angle adjusting means for automatically changing an angle $\theta$ between a direction in which images of the plural light beams are arranged on the predetermined surface and the scanning direction in which the plural light beams are scanned on the predetermined surface, the angle $\theta$ being changed automatically in correspondence to the selected resolution.

28. An apparatus according to claim 27, wherein said plural light beams are modulated with image information at the selected resolution.

29. An apparatus according to claim 27, wherein the plural light beams are deflected at a speed corresponding to the selected resolution.

30. An apparatus according to claim 27, wherein spot size of the scanned plural beams is set in correspondence to the selected resolution.

31. A laser-beam printing apparatus for scanning plural light beams modulated with image information in a selectable one of at least two different image resolutions, said optical scanning apparatus comprising:

light-source means including a plurality of light-emitting portions which emit respective ones of plural light beams;

a recording medium;

scanning means for scanning said recording medium in a scanning direction, said scanning means scanning said recording medium with the plural light beams from said light-source means by deflecting the plural light beams;

optical means disposed in an optical path between said light-source means and said scanning means; and angle adjusting means for automatically changing an angle $\theta$ between a direction in which images of the plural light-beams are arranged on said recording medium and the scanning direction in which the plural light beams are scanned on said recording medium, the angle $\theta$ being changed automatically in correspondence to the selected resolution.

32. An apparatus according to claim 31, wherein said angle adjusting means rotates said light-source means.

33. An apparatus according to claim 31, wherein said angle adjusting means rotates said optical means.

34. An apparatus according to claim 31, wherein said angle adjusting means moves said optical means.

35. An apparatus according to claim 31, wherein said plural light beams are modulated with image information at the selected resolution.

36. An apparatus according to claim 31, wherein the plural light beams are deflected at a speed corresponding to the selected resolution.

37. An apparatus according to claim 31, wherein spot size of the scanned plural beams is set in correspondence to the selected resolution.

38. A laser-beam printing apparatus for scanning plural light beams modulated with image information in a selectable one of at least two different image resolutions, said optical scanning apparatus comprising:

light-source means including a plurality of light-emitting portions which emit respective ones of plural light beams;

a recording medium;

scanning means for scanning said recording medium in a scanning direction, said scanning means scanning said recording medium with the plural light beams from said light-source means by deflecting the plural light beams; and angle adjusting means for automatically changing an angle $\theta$ between a direction in which images of the plural light beams are arranged on said recording medium and the scanning direction in which the plural light beams are scanned on said recording medium, the angle $\theta$ being changed automatically in correspondence to the selected resolution.

39. An apparatus according to claim 38, wherein said plural light beams are modulated with image information at the selected resolution.

40. An apparatus according to claim 38, wherein the plural light beams are deflected at a speed corresponding to the selected resolution.

41. An apparatus according to claim 38, wherein spot size of the scanned plural beams is set in correspondence to the selected resolution.

42. A laser-beam printing apparatus for scanning plural light beams modulated with image information in a selectable one of at least two different image resolutions, said optical scanning apparatus comprising:

light-source means including a plurality of light-emitting portions which emit respective ones of plural light beams;

a recording medium;

rotation means for automatically rotating said light-source means in correspondence to the selected resolution; and deflection means for deflecting the plural light beams from said light-source means toward said recording medium.

43. An apparatus according to claim 42, wherein said plural light beams are modulated with image information at the selected resolution.

44. An apparatus according to claim 42, wherein the plural light beams are deflected at a speed corresponding to the selected resolution.

45. An apparatus according to claim 42, wherein spot size of the scanned plural beams is set in correspondence to the selected resolution.

46. A laser-beam printing apparatus for scanning plural light beams modulated with image information in a selectable one of at least two different image resolutions, said optical scanning apparatus comprising:

optical means including a plurality of light-emitting portions which emit respective ones of plural light beams;

a recording medium;

rotation means for automatically rotating at least a part of said optical means in correspondence to the selected resolution; and deflection means for deflecting the plural light beams from said optical means toward said recording medium.

47. An apparatus according to claim 46, wherein said plural light beams are modulated with image information at the selected resolution.

48. An apparatus according to claim 46, wherein the plural light beams are deflected at a speed corresponding to the selected resolution.

49. An apparatus according to claim 46, wherein spot size of the scanned plural beams is set in correspondence to the selected resolution.

50. A laser-beam printing apparatus for scanning plural light beams modulated with image information in a selectable one of at least two different image resolutions, said optical scanning apparatus comprising:

light-source means including a plurality of light-emitting portions which emit respective ones of plural light beams;

emission control means for controlling the plurality of light-emitting portions;

a recording medium;

scanning means for scanning said recording medium in a scanning direction, said scanning means scanning said recording medium with the plural light beams from said light-source means by deflecting the plural light beams;

optical means disposed in an optical path between said light-source means and said scanning means;

synchronization detection means for detecting the timing of the start of light beam scanning on said recording medium;

angle adjusting means for automatically changing an angle $\theta$ between a direction in which images of the plural light beams are arranged on said recording medium and the scanning direction in which the plural light beams are scanned on said recording medium, the angle $\theta$ being changed automatically in correspondence to the selected resolution;

position detection means for detecting position information relating to a position adjusted by said angle adjusting means; and control means for controlling said emission control means by linking said synchronization detection means with said position detection means.

51. An apparatus according to claim 50, wherein said angle adjusting means rotates said light-source means, and wherein said position detection means detects angular position after the rotation.

52. An apparatus according to claim 50, wherein said angle adjusting means rotates said optical means, and wherein said position detection means detects angular position after the rotation.

53. An apparatus according to claim 20, wherein said angle adjusting means moves said optical means, and wherein said position detection means detects a position after the movement.

54. An apparatus according to claim 50, wherein said plural light beams are modulated with image information at the selected resolution.

55. An apparatus according to claim 50, wherein the plural light beams are deflected at a speed corresponding to the selected resolution.

56. An apparatus according to claim 50, wherein spot size of the scanned plural beams is set in correspondence to the selected resolution.

57. A laser-beam printing apparatus for scanning plural light beams modulated with image information in a selectable one of at least two different image resolutions, said optical scanning apparatus comprising:

light-source means including a plurality of light-emitting portions which emit respective ones of plural light beams;

emission control means for controlling the plurality of light-emitting portions;

a recording medium;

scanning means for scanning said recording medium in a scanning direction, said scanning means scanning said recording medium with the plural light beams from said light-source means by deflecting the plural light beams;

synchronization detection means for detecting the timing of the start of the scanning on said recording medium; and angle adjusting means for automatically changing an angle $\theta$ between a direction in which images of the plural light means are arranged on said recording medium and the scanning direction in which the plural light beams are scanned on said recording medium, the angle $\theta$ being changed automatically in correspondence to the selected resolution.

58. An apparatus according to claim 52, wherein said plural light beams are modulated with image information at the selected resolution.

59. An apparatus according to claim 57, wherein the plural light beams are deflected at a speed corresponding to the selected resolution.

60. An apparatus according to claim 57, wherein spot size of the scanned plural beams is set in correspondence to the selected resolution.

61. A scanning method for scanning a predetermined surface with a plurality of light beams modulated with image information in a selectable one of at least two different image resolutions, said method comprising the steps of:

scanning the predetermined surface in a scanning direction with the plurality of light beams by deflecting the plurality of light beams; and automatically changing an angle $\theta$ between a direction in which images of the plurality of light beams are arranged on the predetermined surface and the scanning direction in which the plurality of light beams are scanned on the predetermined surface, the angle $\theta$ being changed automatically in correspondence to the selected resolution.

62. A method according to claim 61, further comprising the step of modulating said plurality of light beams with image information at the selected resolution.

63. A method according to claim 61, wherein the plural light beams are deflected at a speed corresponding to the selected resolution.

64. A method according to claim 61, wherein spot size of the scanned plural beams is set in correspondence to the selected resolution.

65. A scanning method for scanning a predetermined surface with a plurality of light beams modulated with image information in a selectable one of at least two different image resolutions, said method comprising the steps of:

scanning the predetermined surface with a plurality of light beams emitted from a light-source unit by deflecting the plurality of light beams; and automatically rotating said light-source unit in correspondence to the selected resolution.

66. A method according to claim 65, further comprising the step of modulating said plurality of light beams with image information at the selected resolution.

67. A method according to claim 65, wherein the plural light beams are deflected at a speed corresponding to the selected resolution.

68. A method according to claim 65, wherein spot size of the scanned plural beams is set in correspondence to the selected resolution.

69. A scanning method for scanning a predetermined surface with a plurality of light beams modulated with image information in a selectable one of at least two different image resolutions, said method comprising the steps of:

guiding the plurality of light beams to a deflector via an optical system;

scanning the predetermined surface with the plurality of light beams by deflecting the plurality of light beams with the deflector;

automatically rotating a part of the optical system in correspondence to the selected resolution.

70. A method according to claim 69, further comprising the step of modulating said plurality of light beams with image information at the selected resolution.

71. A method according to claim 69, wherein the plural light beams are deflected at a speed corresponding to the selected resolution.

72. A method according to claim 69, wherein spot size of the scanned plural beams is set in correspondence to the selected resolution.

73. A scanning method for scanning a predetermined surface with a plurality of light beams modulated with image information in a selectable one of at least two different image resolutions, said method comprising the steps of:

scanning the predetermined surface in a scanning direction with the plurality of light beams by deflecting the plurality of light beams;

controlling the emission of the plurality of light beams;

detecting the timing of the start of the scanning of the predetermined surface; and automatically changing an angle $\theta$ between a direction in which images of the plurality of light beams are arranged on the predetermined surface and the scanning direction in which the plurality of light beams are scanned on the predetermined surface, the angle $\theta$ being changed automatically in correspondence to the selected resolution.

74. A method according to claim 73, further comprising the step of modulating said plurality of light beams with image information at the selected resolution.

75. A method according to claim 73, wherein the plural light beams are deflected at a speed corresponding to the selected resolution.

76. A method according to claim 73, wherein spot size of the scanned plural beams is set in correspondence to the selected resolution.

* * * * *

UNITED STATES PATENT AND TRADEMARK OFFICE
CERTIFICATE OF CORRECTION

PATENT NO. : 5,774,248
DATED : June 30, 1998
INVENTOR(S) : TERUO KOMATSU

It is certified that error appears in the above-identified patent and that said Letters Patent is hereby corrected as shown below:

On the title page,
[57] ABSTRACT

Line 9, "simuta-" should be deleted.
Line 10, "neously" should read --simultaneously--.

COLUMN 4

Line 48, "angle 0" should read --angle $\theta$--.

COLUMN 5

Line 21, "conduction" should read --conjunction--.

COLUMN 6

Line 40, "tion" should read --tions--.

COLUMN 7

Line 45, "b" should read --"b"--.

COLUMN 8

Line 20, "0<$\theta$tan$^{-1}$(106/50)65(deg)." should read
--0<$\theta$tan$^{-1}$(106/50)$\doteq$65(deg).--

COLUMN 9

Line 60, "revolution" should read --revolutions--.

UNITED STATES PATENT AND TRADEMARK OFFICE
CERTIFICATE OF CORRECTION

PATENT NO. : 5,774,248
DATED : June 30, 1998
INVENTOR(S) : TERUO KOMATSU

It is certified that error appears in the above-identified patent and that said Letters Patent is hereby corrected as shown below:

COLUMN 11

Line 36, "lasere" should read --laser--.

COLUMN 16

Line 10, "in," should read --in--.
Line 63, "light-beams" should read --light beams--.

COLUMN 18

Line 64, "claim 20," should read --claim 50,--.

COLUMN 19

Line 35, "claim 52," should read --claim 57,--.

UNITED STATES PATENT AND TRADEMARK OFFICE
CERTIFICATE OF CORRECTION

PATENT NO. : 5,774,248
DATED : June 30, 1998
INVENTOR(S) : Teruo Komatsu

It is certified that error appears in the above-identified patent and that said Letters Patent is hereby corrected as shown below:

COLUMN 20

Line 27, "deflector;" should read --deflectors; and--.

Signed and Sealed this

Twenty-fifth Day of May, 1999

Attest:

Q. TODD DICKINSON

*Attesting Officer*   *Acting Commissioner of Patents and Trademarks*